US006525297B2

(12) United States Patent
Doherty

(10) Patent No.: US 6,525,297 B2
(45) Date of Patent: Feb. 25, 2003

(54) MIG GUN NOZZLE WITH REDUCED CROSS-SECTIONAL AREA AT THE FRONT

(75) Inventor: James E. Doherty, Barrington, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/788,040

(22) Filed: Feb. 16, 2001

(65) Prior Publication Data

US 2002/0113047 A1 Aug. 22, 2002

(51) Int. Cl.7 .............................. B23K 9/16; B23K 9/28
(52) U.S. Cl. ........................ 219/137.31; 219/137.44; 219/137.61; 219/137.42
(58) Field of Search .................... 219/137.31, 137.44, 219/137.61

(56) References Cited

U.S. PATENT DOCUMENTS

| 3,025,387 | A | 3/1962 | Kinney ........................ 219/130 |
| 3,283,121 | A | 11/1966 | Bernard et al. ............. 219/130 |
| 3,514,570 | A | 5/1970 | Bernard et al. ............. 219/130 |
| 3,689,733 | A | 9/1972 | Matasovi ..................... 219/130 |
| 4,297,561 | A | 10/1981 | Townsend et al. ..... 219/137.63 |
| 4,365,137 | A | 12/1982 | Tarasov et al. |
| 4,529,863 | A | 7/1985 | Lebel ..................... 219/137.42 |
| 4,554,432 | A | 11/1985 | Baioff .................... 219/137.43 |
| 4,864,099 | A | 9/1989 | Cusick, III et al. ..... 219/137.62 |
| 5,097,108 | A | 3/1992 | Hamal |

FOREIGN PATENT DOCUMENTS

| CA | 2304894 | 11/2000 |
| DE | 2528972 | 12/1976 |
| FR | 2349389 | 11/1977 |
| GB | 2098115 | 11/1982 |

*Primary Examiner*—M. Alexandra Elve
*Assistant Examiner*—Kevin McHenry
(74) *Attorney, Agent, or Firm*—John H. Pilarski; Mark W. Croll

(57) ABSTRACT

A MIG welding gun has a diffuser with an external thread and a frusto-conical back ramp. A nozzle assembly includes an insert with a back ramp and a thread that mates with the diffuser thread. The threads of the diffuser and insert have respective ramps that mate. A single turn of the nozzle assembly on the diffuser causes simultaneous engagement of the insert and diffuser back ramps and of the insert and diffuser thread ramps. Such engagement centers the nozzle to be concentric with the diffuser and also produces a wedging action that retains the nozzle assembly on the diffuser until a relatively substantial reverse torque is applied to the nozzle assembly. The nozzle front end has a narrow annulus, which reduces the amount of radiant heat from the welding arc that reaches the nozzle.

18 Claims, 2 Drawing Sheets

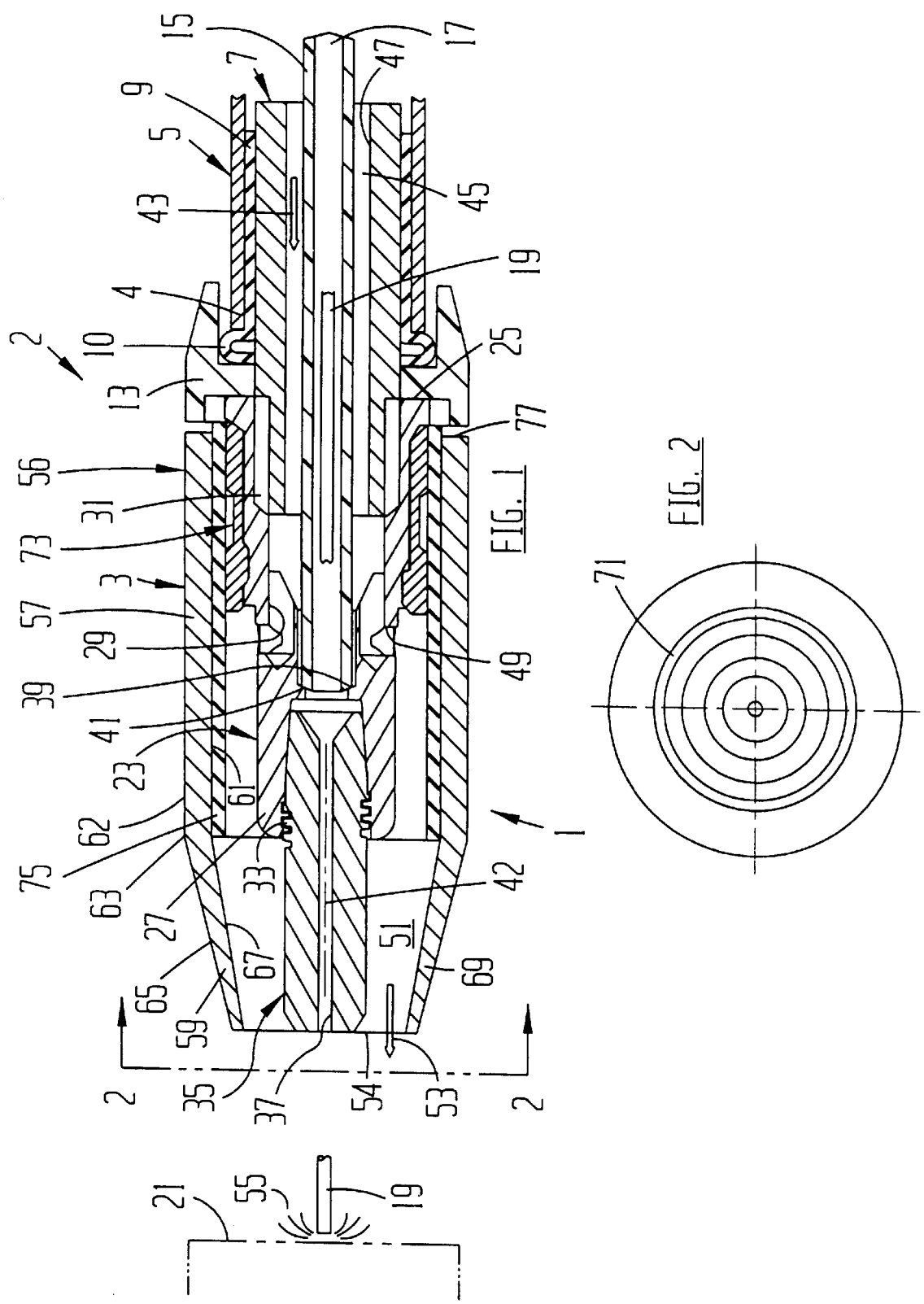

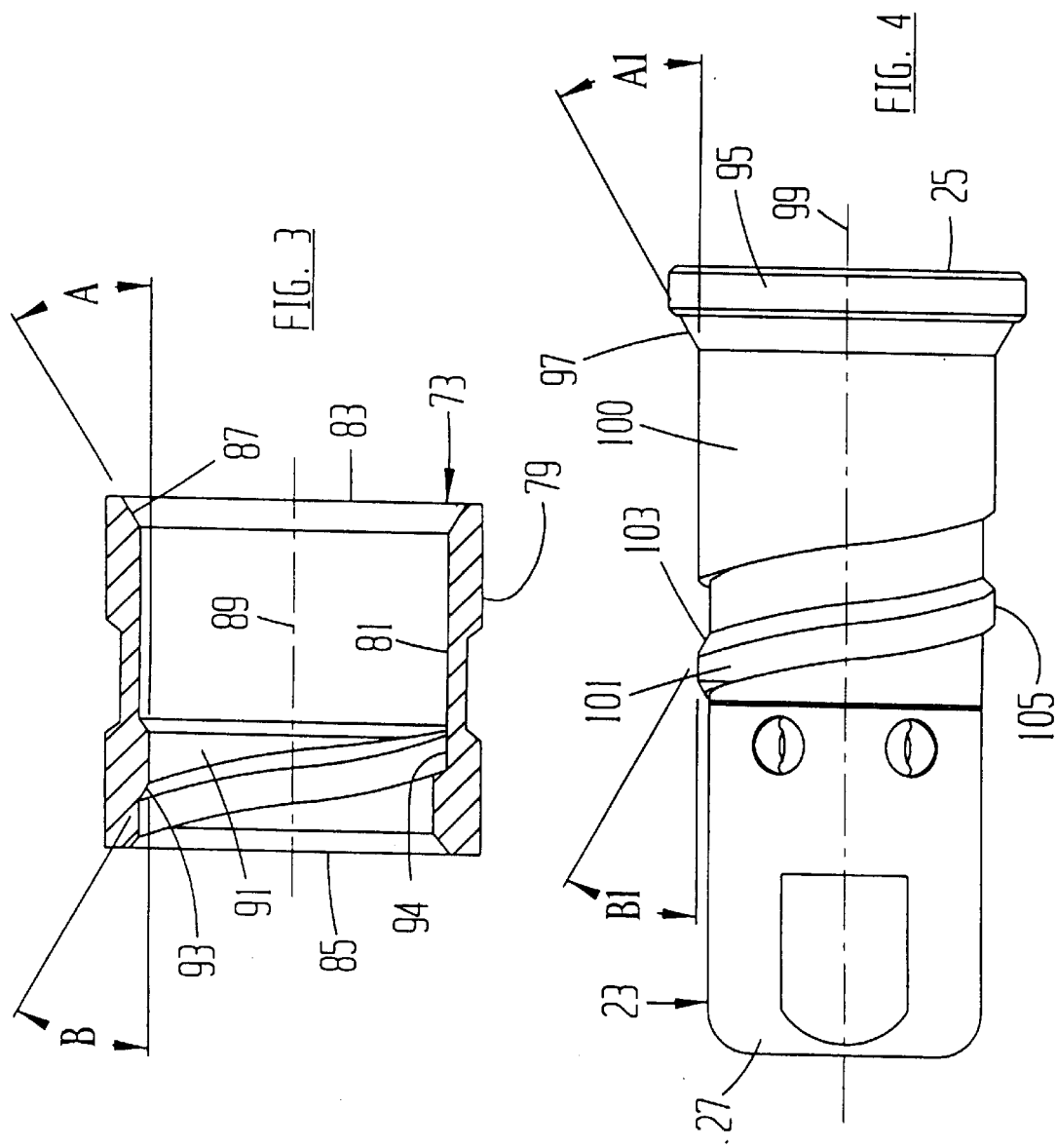

MIG GUN NOZZLE WITH REDUCED CROSS-SECTIONAL AREA AT THE FRONT

BACKGROUND OF THE INVENTION

1. Field of the Invention

This invention pertains to welding guns, and more particularly to the nozzles and diffusers of MIG welding guns.

2. Description of the Prior Art

MIG welding guns are composed of several components that must work together if successful welding is to occur. In addition, for the gun to be acceptable to the welding industry, the various components must be easy to assemble and disassemble.

An especially important welding gun component is the nozzle, which directs inert gas to shield the welding arc from atmospheric air. The nozzle is part of a nozzle assembly, which includes the outer tubular nozzle, a tubular insulator inside the nozzle, and in some cases, a metal insert inside the insulator. The nozzle has a front end that is unsupported and is close to the welding arc. The nozzle back end is retained by the insulator or insert to another gun component, such as a diffuser. The diffuser is at the downstream end of a head tube that extends from the gun handle. A contact tip is connected to a downstream end of the diffuser and is generally surrounded by the nozzle front end. The inert gas flows through an annular passage between the nozzle front end and the contact tip to the welding arc.

Prior nozzles assemblies can be classified in two categories: slip-on, and screw-on. In a slip-on nozzle assembly design, a formed retaining sleeve or retaining rings are used between the nozzle assembly and the diffuser. The diffuser may have grooves in an outer diameter that contain the retaining sleeve or rings. The retaining sleeve or rings create an interference fit between their outer diameters and the inner diameter of the nozzle assembly. The nozzle assembly is forced over the retaining sleeve or rings to create a frictional force that holds the nozzle assembly to the diffuser. The retaining sleeve or rings do not provide a solid connection between the nozzle assembly and the diffuser so as to maintain the nozzle concentric with the diffuser and the contact tip. Eccentricity between the nozzle and the contact tip is detrimental, because it causes uneven flow of the inert gas around the contact tip and welding arc. Another disadvantage of the slip-on nozzle assembly design is that there is no way to positively maintain the nozzle longitudinally in place on the welding gun. Positive retention of the nozzle is especially important during rough usage, as, for example, if an operator uses the nozzle to knock slag from the workpiece. Maintaining proper longitudinal relationship between the nozzle and the contact tip is necessary for satisfactory welding. In addition, in high heat welding conditions, the nozzle and retaining sleeve or rings get hot, which can cause the retaining sleeve or rings to soften and allow the nozzle assembly to fall off the gun.

A screw-on nozzle assembly utilizes several turns of threads to retain it on the diffuser. Normal manufacturing tolerances of the threads allow lateral movement of the nozzle from a true concentric position relative to the diffuser and the contact tip. A screw-on nozzle assembly normally has an insulated flat end surface that abuts a flat surface on the diffuser when the nozzle assembly is fully turned onto the diffuser. Retention of the nozzle assembly on the diffuser depends on a hard stop between the abutting flat surfaces of the nozzle assembly and diffuser. Removal of the nozzle assembly from the diffuser requires turning it through all of the several threads in engagement. In high heat conditions, the parts distort, and removal of the screw-on nozzle assembly is difficult.

The welding arc is, of course, extremely hot. Some heat from the arc transfers by radiation to the nozzle front end. Such heat transfer to the nozzle is detrimental, as it is a major cause of metal distortion and softening of the nozzle material. The annealing temperature of copper, the material from which some nozzles are made, is approximately 800 degrees F. It is highly desirable that the operating temperature of the nozzle assembly be well below that temperature in order that the nozzle maintain its strength and thus be able to withstand rough handling during use.

The heat in the nozzle dissipates in several ways. One way is for the heat to radiate to the atmosphere. Some of the heat is carried away by convection of air past the nozzle. Additional nozzle heat is transferred by conduction through the diffuser and head tube to the gun handle.

Under some conditions, particularly when the temperature difference is greater than approximately 300 degrees F., heat can be transferred by radiation from the nozzle to the contact tip. Consequently, a hot nozzle can raise the temperature of the contact tip. A hot contact tip is undesirable, because it has a shorter service life and reduced performance compared to a cool contact tip. A cool contact tip also minimizes heat transfer by conduction through the diffuser and head tube to the gun handle. Accordingly, an important benefit of a cool nozzle is that it tends to keep the contact tip cool and it also keeps heat distortion of the nozzle to a minimum.

During the course of a welding operation, it is sometimes necessary to replace the contact tip. To do so, it is first necessary to remove the nozzle in order to gain access to the contact tip. In a screw-on nozzle design, the operator must turn the nozzle until it advances off the diffuser. Grabbing the hot nozzle with a gloved hand is cumbersome and potentially uncomfortable, so it is highly desirable that the nozzle be removed as quickly and easily as possible. However, standard threaded connections between the nozzle and diffuser require that the operator turn the nozzle through all the several turns of the mating threads before the nozzle advances off the diffuser. After replacing the contact tip, the reverse procedure of rethreading the hot nozzle on the diffuser must be performed.

Thus, further developments are needed in MIG welding guns.

SUMMARY OF THE INVENTION

In accordance with the present invention, a MIG gun nozzle with reduced cross-sectional area at the front is provided that has greatly improved thermal and mechanical characteristics compared to prior guns. This is accomplished by designing the nozzle with a minimum frontal area and with ramps that center and retain the nozzle on the diffuser.

The nozzle has front and back ends. At the back end is a cylindrical tubular section with inner and outer diameters and a relatively thick wall. At the front end of the cylindrical section is a hollow frusto-conical section. The frusto-conical section has inner and outer surfaces that converge toward the nozzle front end. At the junction of the cylindrical and frusto-conical sections, the wall of the frusto-conical section has the same thickness as the wall of the cylindrical section, and the frusto-conical section inner surface is coincident with the cylindrical section inner diameter. The wall thickness of the frusto-conical section at the nozzle front end is less than the wall thickness at the junction of the cylindrical and frusto-conical sections such that the nozzle front end is a narrow annulus.

In the preferred embodiment, both the thickness of the nozzle front end annulus and the total length of the nozzle between its front and back ends are within limited ranges. Further, the ratio of the nozzle length to the annulus thickness is also within a limited range. Ideally, the annulus thickness is approximately 0.065 inches, and the ideal ratio of nozzle length to annulus thickness is approximately 50.

The nozzle of the invention has a screw-on design. In the preferred embodiment, the nozzle is part of a nozzle assembly that also includes an insulator and an insert. The nozzle assembly insert has an internal thread with a pitch of only a few threads per inch.

The diffuser has an external thread that mates with the thread on the nozzle assembly insert. Preferably, the diffuser is designed such that the nozzle assembly is fully assembled to the diffuser by only about a single turn. After the nozzle assembly has advanced through the turn, the insert contacts a stop on the diffuser.

Further in accordance with the present invention, the nozzle is centered concentrically with the diffuser when the nozzle assembly is fully assembled to the diffuser. For that purpose, the diffuser stop is fabricated as an exterior frusto-conical back ramp that makes a predetermined angle with the diffuser longitudinal axis. There is an interior back ramp on the nozzle assembly insert. The insert back ramp is designed to engage the back ramp on the diffuser when the nozzle is fully assembled to the diffuser. In addition, there is a ramp on the diffuser thread that is oriented oppositely as the diffuser back ramp. Specifically, the flank of the diffuser thread between the thread root and tip is formed as a thread ramp. The angle that the thread ramp makes with the diffuser longitudinal axis is preferably equal to the angle that the diffuser back ramp makes with the diffuser longitudinal axis. The thread of the insert has a ramp that is complimentary to the diffuser thread ramp.

If desired, the insulator can be manufactured with the internal threads and ramp. In that case, a separate insert is not needed.

As the nozzle assembly is assembled to the diffuser, the insert thread ramp slides around the diffuser thread ramp. As the nozzle assembly approaches its fully turned condition, the insert back ramp approaches and then engages the diffuser back ramp. A slight torque on the nozzle produces a wedging action of the insert on the diffuser. The wedging action occurs because of the simultaneous engagement of the surface areas of the insert thread and back ramps with the surface areas of the diffuser thread and back ramps, respectively. The wedging action performs two simultaneous functions. First, the wedging action automatically centers the insert and nozzle assembly to be concentric with the diffuser. Second, the wedging action causes the insert and nozzle assembly to become tightly retained against loosening on the diffuser. To release the nozzle assembly, a relatively substantial reverse torque must be applied.

During operation, the nozzle remains exceptionally cool. The narrow annulus at the nozzle front end is practically the only place on the nozzle that is in a direct line of sight with the welding arc. Consequently, only a minimal amount of radiant heat from the welding arc reaches the nozzle. At the same time, the much larger areas of the outer surfaces of the nozzle cylindrical and frusto-conical sections that are in the shadow of the arc allow any heat to escape by radiation and convection. Consequently, the nozzle operates at a relatively cool temperature, which enhances both its performance and that of the contact tip.

Other advantages, benefits, and features of the present invention will become apparent to those skilled in the art upon reading the detailed description of the invention.

BRIEF DESCRIPTION OF THE DRAWINGS

FIG. 1 is a cross-sectional view of a portion of the MIG gun nozzle with reduced cross-sectional area at the front.

FIG. 2 is a view taken along line 2—2 of FIG. 1.

FIG. 3 is a longitudinal cross-sectional view on an enlarged scale of the insert used with the MIG gun of the present invention.

FIG. 4 is an enlarged side view of the diffuser of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring first to FIGS. 1 and 2, the outlet portion 1 of a MIG welding gun 2 is illustrated that includes the present invention. The welding gun outlet portion 1 is located at one end 4 of a head tube 5 that is part of the welding gun 2. A second end of the head tube 5 is secured to a handle of the gun, not shown but well known to persons skilled in the art. Inside the head tube end 4 is a tubular conductor 7. The head tube is pressed over the conductor 7, with an electrically insulative sleeve 9 between them. The insulator sleeve 9 preferably has a flange portion 10 that lies against the head tube end 4. An insulative ring 13 surrounds the conductor adjacent the insulative sleeve flange portion 10. Inside the conductor is a liner 15. The liner 15 has an interior 17 that is sized to guide a weld wire 19 toward a workpiece typically represented at reference numeral 21.

The gun portion 1 further comprises a diffuser 23. The diffuser 23 has an upstream end 25, a downstream end 27, and a bore 29. In the diffuser bore 29 at the upstream end 25 are internal threads 31. The diffuser screws onto the conductor 7 by means of the threads 31, with the insulative ring 13 squeezed between the diffuser upstream end and the insulative sleeve flange portion 10. The diffuser bore has a locating surface 39, which, as is illustrated in FIG. 1, may be frusto-conical in shape. The liner 15 has a downstream end 41 with a complimentary shape. Accordingly, the liner downstream end 41 is positively located against the diffuser locating surface 39. There are internal threads 33 in the diffuser bore at the diffuser downstream end 27. A contact tip 35 connects to the diffuser downstream end by means of the threads 33. The contact tip has a hole 37 through it that guides the weld wire 19 from the liner 15 to the workpiece 21. The conductor 7, diffuser, and contact tip define a common longitudinal axis 42.

A nozzle 3 surrounds the diffuser 23 and the contact tip 35. In the illustrated construction, the nozzle 3 is part of a nozzle assembly 56 that also includes a tubular insert 73, and an electrically insulative insulator 75 between the nozzle and the insert. However, in some applications the insulator and the insert can be combined into a single component made from an electrically insulative material. The nozzle, insert 73, and insulator 75 are pressed together, with the insert being at the back end 77 of the nozzle.

During operation of the MIG gun 2, an inert gas flows in a downstream direction 43 from a welding machine through an annular passage 45 between the conductor inner diameter 47 and the liner 15. From the annular passage 45, the inert gas flows to the diffuser bore 29 and out radial holes 49 into a second annular passage 51 between the nozzle 3, the diffuser downstream end 27, and the contact tip 35. The inert gas flows out the welding gun, arrow 53, at the nozzle front end 54 to surround the weld wire 19 and shield the weld wire 19 from atmospheric air.

The particular nozzle 3 shown is comprised of two sections: a tubular cylindrical back section 57, and a tubular frusto-conical front section 59. The cylindrical back section 57 has an inner diameter 61 and an outer diameter 62 that are substantially parallel for the length of the cylindrical section. The frusto-conical section 59 joins to the cylindrical section at a junction 63. At the junction 63, the frusto-conical section has an outer surface 65 with an outer diameter 66 that is the same as the cylindrical section outer diameter 62. Also, the frusto-conical section has an inner surface 67 with an inner diameter 68 at the junction 63 that is equal to the inner diameter 61 of the cylindrical section.

In the illustrated construction, the outer surface 65 of the frusto-conical section 59 converges toward the nozzle front end 54 at a steeper angle than the inner surface 67. Consequently, the thickness of the wall 69 of the nozzle frusto-conical section 59 is not uniform between the junction 63 and the nozzle front end 54. Rather, the wall thickness decreases in the direction of the nozzle front end. As a result, the nozzle front end consists of a narrow annulus 71 having an outer diameter 72 and an inner diameter 74.

The overall length of the nozzle 3 between its front end 54 and back end 77 is preferably between approximately 2.25 inches and 3.50 inches. The most preferred length is approximately 3.00 inches. The thickness of the nozzle annulus 71 is in a preferred range of between approximately 0.065 inches and 0.080 inches. In any event, the ratio of the nozzle length to annulus thickness is greater than 40; the ideal ratio is approximately 50. Practical outer diameters for the nozzle range from approximately 0.70 inches to 0.90 inches.

The retention of the nozzle 3 on the diffuser 23 constitutes an important feature of the present invention. Retention is achieved by means of the nozzle assembly insert 73. Also looking at FIG. 3, the insert 73 has an outer diameter 79 that presses against the insulator 75, an inner diameter 81, a back end 83, and a front end 85. There is an interior frusto-conical back ramp 87 at the intersection of the inner diameter 81 and the back end 83. The back ramp 87 makes an angle A with the insert longitudinal axis 89. A preferred angle A is approximately 30 degrees.

Near the front end 85 of the insert 73 is an internal thread 91. The preferred pitch of the thread 91 is approximately 0.193 inches. The thread 91 may have a cross-sectional form generally similar to a stub acme thread form, if desired. The flank of the thread that is toward the insert front end 85 is tapered at an angle B relative to the insert longitudinal axis 89, thereby forming a thread ramp 93. It is preferred that the angles A and B are equal. For proper assembly with the diffuser 23, the major diameter 94 of the insert thread is slightly smaller than the inner diameter 81. In the design in which a separate insert is not used, the internal thread and back ramp are machined directly into the insulator near the nozzle back end 77.

Turning to FIG. 4, the diffuser 23 has a circular flange 95 at the upstream end 25. The flange 95 intersects a frusto-conical back ramp 97. The diffuser back ramp 97 makes an angle A1 with the diffuser longitudinal axis 99. The angle A1 is equal to the angle A of the nozzle assembly insert 73. The diffuser back ramp intersects a cylindrical outer diameter 100 that is slightly smaller than the inner diameter 81 of the insert 73. Between the diffuser upstream end and downstream end 27 is an external thread 101. According to one aspect of the invention, the diffuser thread 101 has but a single turn. The external thread 101 has the same pitch and thread form as the internal thread 91 of the insert 73. In addition, the flank of the diffuser thread 101 that is toward the upstream end is tapered at an angle B1 relative to the diffuser longitudinal axis 99, thereby creating a diffuser thread ramp 103. The angle B1 is equal to the angle B of the insert. It is preferred that the angle B1 equal the angle A1 of the diffuser back ramp 97. The major diameter 105 of the diffuser thread is slightly less than the insert inner diameter 81.

Returning to FIG. 1, the nozzle assembly 56 is shown assembled to the diffuser 23. To do so, the insert 73 is slipped over the diffuser downstream end 27. The insert back end 83 and inner diameter 81 pass over the diffuser thread 101 until the insert thread 91 contacts the diffuser thread. The nozzle assembly is rotated slightly, if necessary, until the insert and diffuser threads mate. From the point of initial mating, the nozzle assembly is further turned. Doing so causes the insert ramp thread 93 to bear against and follow the diffuser thread ramp 103 and advance the nozzle assembly until the surface area of the insert back ramp 87 engages the surface area of the diffuser back ramp 97. As mentioned, the diffuser thread may have a single turn. In that case, the diffuser and insert are so dimensioned that the surface area of the insert back ramp engages the surface area. of the diffuser back ramp at the completion of one turn of the nozzle assembly on the diffuser. A slight additional torque applied to the nozzle assembly produces a wedging action of the insert on the diffuser. The wedging action is a result of the simultaneous engagement of the surface area of the insert back ramp 87 with the surface area of the diffuser back ramp 97, and the mating of the insert thread ramp 93 with the diffuser thread ramp 103. The wedging action of the insert and diffuser back ramp surface areas causes the insert and thus the nozzle assembly to remain firmly retained in place on the diffuser. The nozzle assembly remains firmly retained on the diffuser until a relatively substantial reverse torque is intentionally applied to the nozzle 3. When that occurs, a single reverse turn of the nozzle assembly is sufficient to remove it from the welding gun 2. If desired, the diffuser thread, and the diffuser and insert back ramps, can be dimensioned such that the insert back ramp engages the diffuser back ramp at the completion of more or less than one turn of the nozzle assembly.

A second major benefit of the engaged ramps 87, 97 and 93, 103 is that they cause the nozzle assembly insert 73 to automatically center on the diffuser 23 such that their respective longitudinal axes 89 and 99 coincide with each other and also with the common longitudinal axis 42. The passage 51 between the nozzle front end 54 and the contact tip 35 for the inert gas is thus uniform around the contact tip, which is highly beneficial for both shielding the welding arc 55 and economy of gas usage. Moreover, the sturdy and centered retention of the nozzle assembly 56 on the diffuser effectively eliminates the possibility that the nozzle front end could drift toward the contact tip during use.

Thus, it is apparent that there has been provided, in accordance with the invention, a MIG gun nozzle with reduced cross-sectional area at the front that fully satisfies the aims and advantages set forth above. While the invention has been described in conjunction with specific embodiments thereof, it is evident that many alternatives, modifications, and variations will be apparent to those skilled in the art in light of the foregoing description.

Accordingly, it is intended to embrace all such alternatives, modifications, and variations as fall within the spirit and broad scope of the appended claims.

I claim:

1. A MIG welding gun comprising:
   a. a head tube;
   b. a conductor that protrudes beyond an end of the head tube;
   c. a diffuser having upstream and downstream ends and defining a bore between the upstream and downstream ends, the bore adjacent the upstream end having threads that screw to the conductor, the diffuser further having an external thread of a predetermined pitch; and
   d. a nozzle assembly assembled to the diffuser comprising:
      i. a nozzle having front and back ends and a predetermined length, a cylindrical section adjacent the back end with a first inner diameter and a first outer diameter and a first wall thickness, and a frusto-conical section adjacent the front end that joins the cylindrical section at a junction, the frusto-conical section having inner and outer surfaces that each converge toward the front end, the frusto-conical section having a second wall thickness at the junction with the cylindrical section that is equal to the first wall thickness, the frusto-conical section having a third wall thickness at the front end; and
      ii. means in the nozzle for mating with the diffuser thread.

2. The MIG welding gun claim 1 wherein the third wall thickness is less than the first wall thickness.

3. The MIG welding gun of claim 1 wherein:
   a. the nozzle defines a longitudinal axis;
   b. the junction between the nozzle cylindrical section and the frusto-conical section lies along a plane that is perpendicular to the nozzle longitudinal axis; and
   c. the frusto-conical outer surface converges toward the nozzle front end at a steeper angle than the frusto-conical section inner surface.

4. The MIG welding gun of claim 1 wherein the third wall thickness is between approximately 0.065 inches and 0.080 inches.

5. The MIG welding gun of claim 1 wherein the ratio of the nozzle predetermined length to the third wall thickness is greater than 40.

6. The MIG welding gun of claim 1 wherein the ratio of the nozzle predetermined length to the third wall thickness is approximately 50.

7. A MIG gun nozzle comprising:
   a. a cylindrical section having first and second ends and inner and outer surfaces, and a first wall thickness, and defining a longitudinal axis; and
   b. a frusto-conical section defining a longitudinal axis common with the cylindrical section longitudinal axis and having a first end joined to the cylindrical section second end along a junction that defines a plane that is perpendicular to the common longitudinal axis, and a second end, the frusto-conical section having a second wall thickness at the first end thereof equal to the first wall thickness, and having inner and outer surfaces that converge toward the frusto-conical section second end, wherein the plane passes through an intersection of the inner surface of the frusto-conical section with the inner surface of the cylindrical section and through an intersection of the outer surface of the frusto-conical section with the outer surface of the cylindrical section.

8. The nozzle of claim 7 wherein the frusto-conical section outer surface converges toward the frusto-conical section second end at a steeper angle than the inner surface.

9. The nozzle of claim 7 wherein the frusto-conical section has a third wall thickness at the second end thereof that is less than the second wall thickness.

10. The nozzle of claim 7 wherein the third wall thickness is between approximately 0.065 inches and 0.080 inches.

11. The nozzle of claim 7 wherein the ratio of the distance between the cylindrical section first end and the frusto-conical section second end to the third wall thickness is greater than 40.

12. The nozzle of claim 7 wherein the ratio of the distance between the cylindrical section first end and the frusto-conical section second end to the third wall thickness is approximately 50.

13. Apparatus for welding a workpiece comprising:
   a. a diffuser that defines a longitudinal axis;
   b. a contact tip connected to the diffuser;
   c. a weld wire passing through the diffuser and the contact tip-for producing an electric arc at a workpiece; and
   d. a nozzle defining a common longitudinal axis with the diffuser longitudinal axis and substantially surrounding the diffuser and the contact tip and having a front end proximate the welding arc, a back end, a cylindrical section with an inner diameter adjacent the back end and with inner and outer surfaces, and a frusto-conical section adjacent the front end that joins to the cylindrical section at a junction that lies in a plane that is perpendicular to the common longitudinal axis, the frusto-conical section having inner and outer surfaces that converge toward the front end, the cylindrical section having a first wall thickness between the back end and the junction, the frusto-conical section having a wall adjacent the junction that has a thickness equal to the first wall thickness and a second wall thickness at the nozzle front end, wherein the plane passes through an intersection of the inner surface of the frusto-conical section with the inner surface of the cylindrical section and through an intersection of the outer surface of the frusto-conical section with the outer surface of the cylindrical section.

14. The apparatus of claim 13 wherein the nozzle outer surface converges toward the front end at a steeper angle than the inner surface.

15. The apparatus of claim 13 wherein the frusto-conical section inner and outer surfaces terminate in a narrow annulus having an inner diameter less than the nozzle cylindrical section inner diameter,
   so that heat radiated to the nozzle from the electric arc is minimized.

16. The apparatus of claim 13 wherein the second wall thickness is less than the first wall thickness.

17. The apparatus of claim 13 wherein the second wall thickness is between approximately 0.065 inches and 0.080 inches.

18. The apparatus of claim 13 wherein the distance between the nozzle front and back ends is approximately 50 time greater than the second wall thickness.

* * * * *